L. R. QUADE.
AUTO TIRE.
APPLICATION FILED JUNE 11, 1920.
1,413,777.
Patented Apr. 25, 1922.
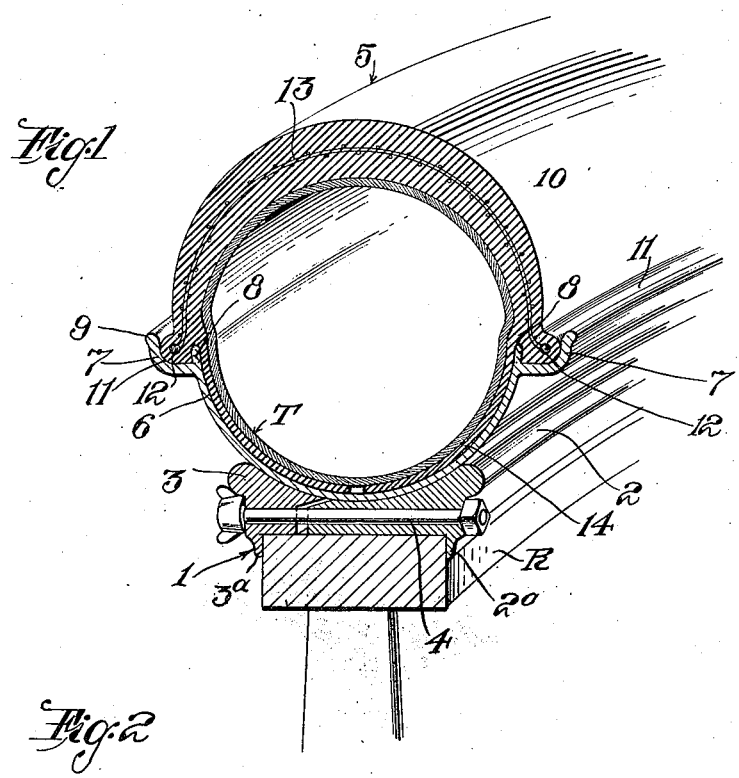
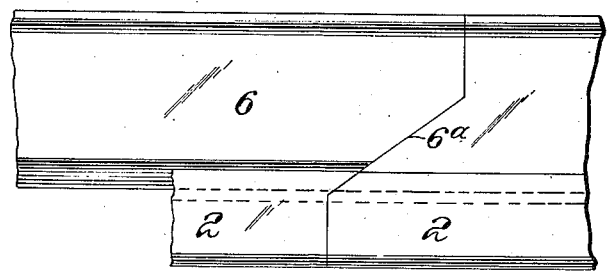
Inventor
Louis R. Quade
By Geo. P. Kimmel
Attorney

UNITED STATES PATENT OFFICE.

LOUIS R. QUADE, OF FOLEY, MINNESOTA.

AUTO TIRE.

1,413,777. Specification of Letters Patent. Patented Apr. 25, 1922.

Application filed June 11, 1920. Serial No. 388,142.

*To all whom it may concern:*

Be it known that I, LOUIS R. QUADE, a citizen of the United States, residing at Foley, in the county of Benton and State of Minnesota, have invented certain new and useful Improvements in an Auto Tire, of which the following is a specification.

This invention relates to pneumatic vehicle tires and to means for attaching them to a wheel.

The object of the invention is to so construct such a tire that while possessing all of the advantages of a pneumatic tire of ordinary construction may be much more cheaply manufactured and will not be subject to rim cuts which are a bane to the ordinary pneumatic tire.

Another object is to provide simple and efficient means for mounting such tire on the felly of the ordinary wheel already in use.

With these and other objects in view, the invention consists in certain novel features of construction as hereinafter shown and described and then specifically pointed out in the claim, and in the drawings illustrative of the preferred embodiment of the invention.

In the accompanying drawings:

Figure 1 represents a transverse sectional perspective view of a rim and tire constructed in accordance with this invention, and Figure 2 is a detail side elevation of a portion of the auxiliary rim and the means for connecting it to a wheel.

In the embodiment illustrated a portion of an ordinary wheel felly R is shown on which is mounted the tire 5 constituting a part of this invention and which is connected with said rim or felly by an auxiliary rim 6 and an ordinary demountable rim 1. This rim 1 is composed of longitudinally separable sections 2 and 3 held connected by bolts 4 passing transversely through the two sections. These rim members 2 and 3 have side flanges 2ª and 3ª designed to engage the opposite side edges of the felly R as is shown clearly in Figure 1 and the sections are transversely and obliquely split as shown in Figure 2 to provide for their ready application to the felly R.

The tire 5 constituting a portion of this invention is supported by an inner metal auxiliary rim member 6 semi-circular in cross section and provided along its side edges with outwardly and upwardly curved substantially L-shaped flanges 7 projecting from the outer faces thereof at a point spaced inwardly from the edges 8 of the member to form seats for the cooperating member of the tire as will be presently described. The edges 8 form the inner walls for the seats of the tread member beads and form a closure for the joint between these beads and the rim 6 to avoid all possibility of the inner tube being blown out or pinched at the joint. The free edges of the flanges 7 are preferably flared as shown at 9 to facilitate the insertion of the beads 11 carried by the side edges of the tread member 10.

The tread member 10 is also semi-circular in cross section and the beads 11 formed at the edges thereof have mounted in them reinforcing wires 12 to prevent the member 10 from blowing off the tire when the latter is inflated. This tread section 10 may be constructed of the same material as an ordinary tire shoe and is here shown provided with a reinforce 13 embedded therein although this may be omitted if found desirable.

Extending from the inner face of the member 10 adjacent the edges thereof are two soft canvas flaps 14 which are designed to be arranged between the tire or shoe 5 and the inner tube T to prevent chafing of the latter especially where the members 6 and 10 unite.

The metal member 6 is split transversely preferably at an oblique angle as shown at 6ª to facilitate its application to and removal from the wheel and is connected and disconnected in the same manner that the ordinary quick detachable rim now in use is applied.

From the above description it will be obvious that a tire and rim constructed as above described of an inner metallic member which extends substantially halfway around the tire while the outer or tread portion only is composed of rubber composition may be very cheaply constructed and yet will have all of the advantages of the more expensive pneumatic tire shoe composed entirely of rubber fabric. The member 10 extends over the entire tread portion of the tire and a portion of the sides thereof being mounted in the seats of the metal rim member 6 and when for any reason the tire should be used when partially deflated the bulge which usually occurs in the side walls of the rubber shoe will take place at the joint between the two members 6 and 10 thereby avoiding all possibility of rim cuts.

The preferred embodiment of the invention is disclosed in the drawings and set forth in the specification, but it will be understood that any modifications within the scope of the claim may be made in the construction without departing from the principle of the invention or sacrificing any of its advantages.

What is claimed is:

In a device of the class described, a demountable rim composed of a metal ring semi-circular in cross section and having on its outer face adjacent its edges and spaced inwardly therefrom substantially L-shaped flanges forming in connection with the ring circumferential trough-like tire seats substantially U-shaped in cross section, the free edges of the outer walls of which are slightly flared and the base or the inner portion of the flared edges being in alinement with the edges of said ring; combined with a flexible tread member having beaded margins fitting in said seats, and a pneumatic inner tube, the inflation of which forces the beads of the tread member into locking engagement with their seats.

In testimony whereof, I affix my signature hereto.

LOUIS R. QUADE.